(12) United States Patent
Schoenherr (10) Patent No.: US 11,139,541 B2
(45) Date of Patent: Oct. 5, 2021

(54) BATTERY TERMINAL COMPRISING AN INTEGRATED SPRING OR A FLEXIBLE PAD

(71) Applicant: Robert Bosch GmbH, Stuttgart (DE)

(72) Inventor: Robert Schoenherr, Oxford, MI (US)

(73) Assignees: Robert Bosch Battery Systems LLC, Orion, MI (US); Robert Bosch GmbH, Stuttgart (DE)

( * ) Notice: Subject to any disclaimer, the term of this patent is extended or adjusted under 35 U.S.C. 154(b) by 25 days.

(21) Appl. No.: 15/765,713

(22) PCT Filed: Sep. 28, 2016

(86) PCT No.: PCT/EP2016/073050
§ 371 (c)(1),
(2) Date: Apr. 3, 2018

(87) PCT Pub. No.: WO2017/063874
PCT Pub. Date: Apr. 20, 2017

(65) Prior Publication Data
US 2018/0287125 A1    Oct. 4, 2018

Related U.S. Application Data

(60) Provisional application No. 62/242,357, filed on Oct. 16, 2015.

(51) Int. Cl.
*H01M 50/543*   (2021.01)
*H01M 50/502*   (2021.01)
(Continued)

(52) U.S. Cl.
CPC ..... *H01M 50/543* (2021.01); *H01M 10/0525* (2013.01); *H01M 50/502* (2021.01); *H01M 50/531* (2021.01)

(58) Field of Classification Search
CPC .......... H01M 2/30; H01M 2/202; H01M 2/26; H01M 2/0207; H01M 10/0525;
(Continued)

(56) References Cited

U.S. PATENT DOCUMENTS 3,384,857 A   5/1968   Stoutenburgh
4,756,415 A   7/1988   Call
(Continued)

FOREIGN PATENT DOCUMENTS

JP   H07142039   6/1995
JP   H09274906   10/1997
(Continued)

OTHER PUBLICATIONS

JP2010282811A Espacenet translation Amezutsumi (Year: 2010).*
PCT International Search Report for PCT/EP2016/073050.

*Primary Examiner* — Cynthia H Kelly
*Assistant Examiner* — Kirsten B Tysl
(74) *Attorney, Agent, or Firm* — Kelly McGlashen; Maginot, Moore & Beck LLP (57) ABSTRACT

A battery system includes a first battery cell that is electrically connected to a second battery cell via directed contact between compliant terminals of the first and second battery cells. The compliant terminals include a first end that is electrically connected an electrode assembly disposed within the cell, a second end disposed outside the cell, and an elastically compliant portion disposed between the second end and a cell housing.

8 Claims, 7 Drawing Sheets

(51) Int. Cl.
*H01M 50/531* (2021.01)
*H01M 10/0525* (2010.01)

(58) Field of Classification Search
CPC .. H01M 50/51; H01M 50/502; H01M 50/503; H01M 50/505; H01M 50/507; H01M 50/509
See application file for complete search history.

(56) References Cited

U.S. PATENT DOCUMENTS

| | | |
|---|---|---|
| 5,169,733 A | 12/1992 | Savovic et al. |
| 8,232,769 B2 | 7/2012 | Paczkowski |
| 2003/0162091 A1* | 8/2003 | Watanabe ........... H01M 2/0262 429/156 |
| 2009/0305116 A1* | 12/2009 | Yang ................... H01M 2/0212 429/61 |
| 2011/0159352 A1 | 6/2011 | Culver et al. |
| 2016/0181579 A1* | 6/2016 | Geshi ................... H01M 2/206 429/61 |

FOREIGN PATENT DOCUMENTS

| | | |
|---|---|---|
| JP | 2000100473 | 4/2000 |
| JP | 2000311714 | 11/2000 |
| JP | 2009087555 | 4/2009 |
| JP | 2010282811 A * | 12/2010 |
| JP | 2011254723 | 12/2011 |
| JP | 2013246986 | 12/2013 |
| WO | WO-2015064097 A1 * | 5/2015 |

\* cited by examiner

BATTERY TERMINAL COMPRISING AN INTEGRATED SPRING OR A FLEXIBLE PAD

BACKGROUND

1. Field of the Invention

The present invention relates to terminals for forming electrical connections between two or more battery cells or between a battery cell and another device, and, more particularly, to a battery cell having a compliant terminal.

2. Description of the Related Art

Battery packs provide power for various technologies ranging from portable electronics to renewable power systems and environmentally friendly vehicles. For example, hybrid electric vehicles (HEV) use a battery pack and an electric motor in conjunction with a combustion engine to increase fuel efficiency. Battery packs are formed of a plurality of battery modules, where each battery module includes several electrochemical cells. The cells are arranged in stacks and are electrically connected in series or in parallel. Likewise, the battery modules within a battery pack are electrically connected in series or in parallel.

In some conventional battery systems, the electrical connections are made with terminals of the battery cells using electrically conductive jumpers, leads, bus bars, etc., which may be rigid or flexible. The battery terminals themselves are made to precise requirements and are typically rigidly fixed to the respective cell housings. In many instances, the electrical connections are made by welding, which be problematic since welding introduces elevated temperatures to the battery cells. Such elevated temperatures can damage the cell, and for some types of cells such as Lithium-ion cells, the elevated temperature can lead to an explosion. Moreover, it is difficult to replace an individual cell once it has been connected to the battery system by welding, whereby servicing of the corresponding battery pack becomes expensive. In other conventional battery packs, the cell-to-cell electrical connections may be formed mechanical methods such as attaching bus bars to the cell terminals via fastener such as a nut and threaded stud. Such methods are labor-intensive and can be prone to difficulties such as those related to over or under tightening of the fastener.

SUMMARY

In some aspects, a battery cell includes a cell housing, an electrode assembly disposed in the cell housing in a sealed manner, and an elastically compliant terminal that extends through the cell housing and is electrically connected to the electrode assembly. The terminal includes a first end that is connected to the electrode assembly, and a second end that is configured to form an electrical connection with an adjacent electrical conductor for example a terminal of an adjacent cell. In addition, the terminal includes a compliant portion disposed between the terminal first end and the cell housing. In some embodiments, the compliant portion includes an elastically compliant conductive pad that is disposed between the terminal first end and the cell housing.

Advantageously, the elastically compliant terminal enables a lower resistance contact and reduces manufacturing costs by reducing requirements for precision machining or grinding (for example, to achieve required opening tolerances).

DETAILED DESCRIPTION

Figure 1:
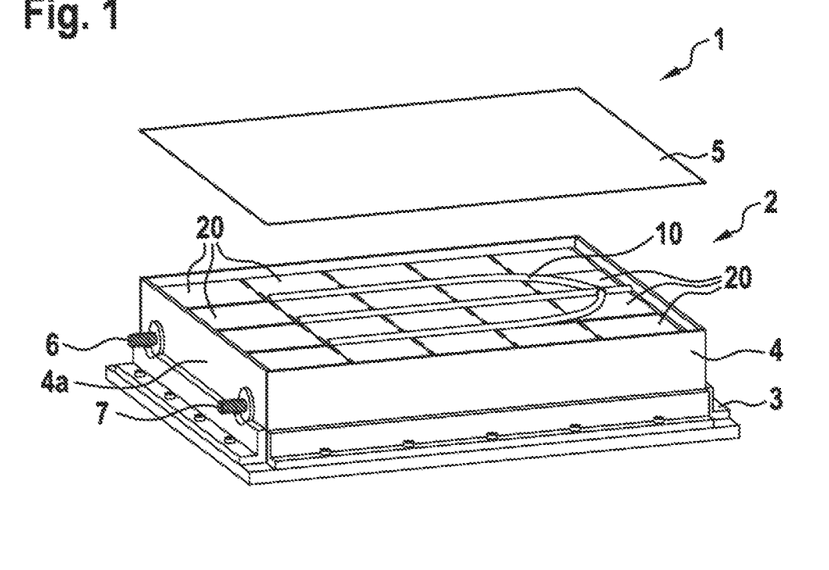
FIG. 1 is a partially exploded perspective view of a battery pack including an array of electrochemical cells, each cell having compliant terminals.
Figure 2:
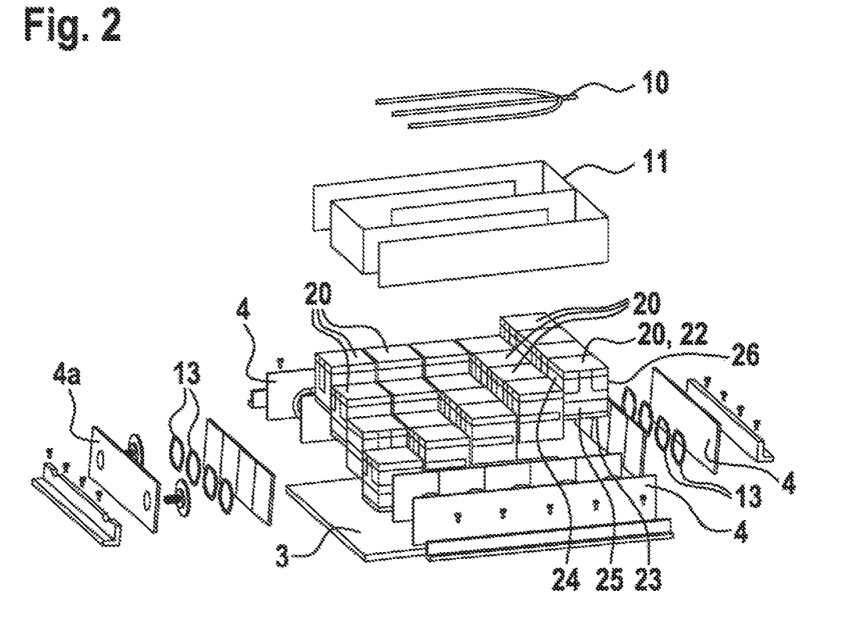
FIG. 2 a fully exploded perspective view of the battery pack of FIG. 1 with the cover omitted.
Figure 3:
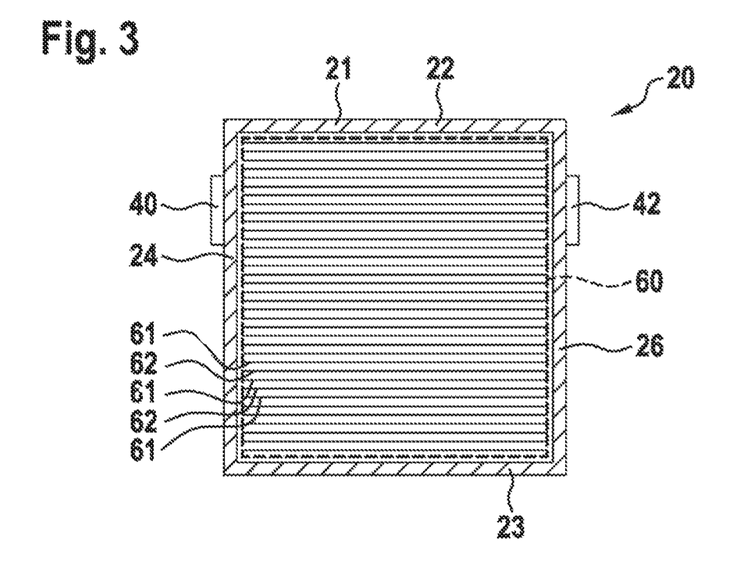
FIG. 3 is a schematic cross sectional view of an electrochemical cell including elastically compliant terminals.

Referring to FIGS. 1-3, a battery pack 1 used to provide electrical power includes electrochemical cells 20 that are electrically interconnected and stored in an organized manner within a battery pack housing 2. The cells 20 are lithium-ion cells that include an electrode assembly 60 (FIG. 6) that is sealed within a cell housing 21 along with an electrolyte to form a power generation and storage unit. In some embodiments, groups of cells 20 may be bundled together to form battery modules (not shown), which in turn are stored within the battery pack housing 2. However, in the illustrated embodiment, the cells 20 are not bundled into modules and instead are directly electrically connected to battery pack housing terminals 6, 7. Within the battery module and/or within the battery pack housing 2, the cells 20 are electrically directly connected in series or in parallel, as discussed further below.

The battery pack housing 2 includes a base plate 3 and a sidewall 4 having one end joined to and surrounding a periphery of the base plate 3. The battery pack housing 2 also includes a lid 5 that is detachably connected to an opposed end of the sidewall 4. The battery pack 1 includes a positive battery pack terminal 6 and a negative battery pack terminal 7 which are supported on, and extend through, a first sidewall portion 4a of the sidewall 4.

Electrically insulative sheets 11 are disposed between the cells 20 and the sidewall 4, as well as at appropriate locations between adjacent cell rows to prevent short circuiting of the serial conductive path through the array of cells 20.

The battery pack may also include a sensor lead harness 10 that overlies the cell array enables the state of each cell 20 to be monitored. The sensor lead harness 10 may be connected to a battery system controller (not shown) that may disposed within the battery pack housing 2 or at an external location.

The cells 20 include a pouch-type cell housing 21 formed of a metal laminated film. The cell housing 21 has a rectangular shape. In the illustrated embodiment, the cell housing 21 is cube shaped, and includes six orthogonal surfaces. The surfaces include a first end 22, a second end 23 that is opposed to the first end 22, a first side 24, a second side 25 adjoining the first side 24, a third side 26 adjoining the second side 25 and being opposed to the first side 24, and a fourth side 27 adjoining the third side 26 and the first side 24, the fourth side 27 being opposed to the second side 25. Each of the first side 24, the second side 25, the third side 26 and the fourth side 27 extend between the first end 22 and the second end 23, and the six surfaces together define a sealed interior space occupied by the electrode assembly 60.

The electrode assembly 60 includes a series of stacked positive electrode plates 61 alternating with negative electrode plates 62 and separated by an intermediate separator plates (not shown). The electrode plates are very thin (e.g., having a thickness on the order of about 0.095 to 0.145 mm) compared to the overall cell thickness (e.g. having a thickness on the order of tens or hundreds of mm) and thus are illustrated schematically in FIGS. 3, 6 and 7.

Each cell 20 includes an electrically conductive first cell terminal 40 that is electrically connected to one of the positive electrode plates 61 and the negative electrode plates 62 (for example, to the positive electrode plate 61), and an electrically conductive second cell terminal 42 that is electrically connected to the other of the positive electrode plates 61 and the negative electrode plates 62 (for example, to the negative electrode plate 62). In the illustrated embodiment, the first cell terminal 40 is disposed on one side (i.e., the first side 24) of the cell housing 21 and the second cell terminal 42 is disposed on another side such the opposed side (i.e., the third side 26) of the cell housing 21.

Figure 6:
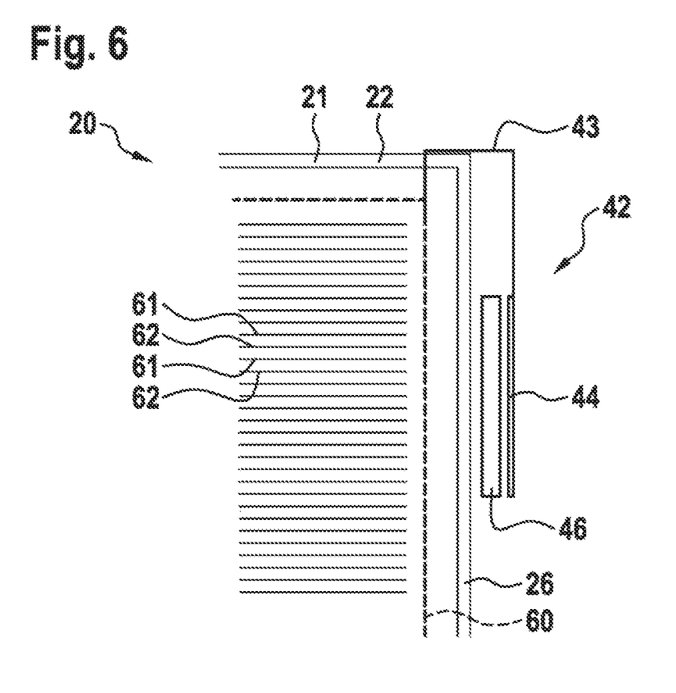
FIG. 6 is a schematic cross sectional view of a portion of the cell of FIG. 3 in which the terminal is partially exploded and illustrating an electrical connection configuration.
Figure 8:
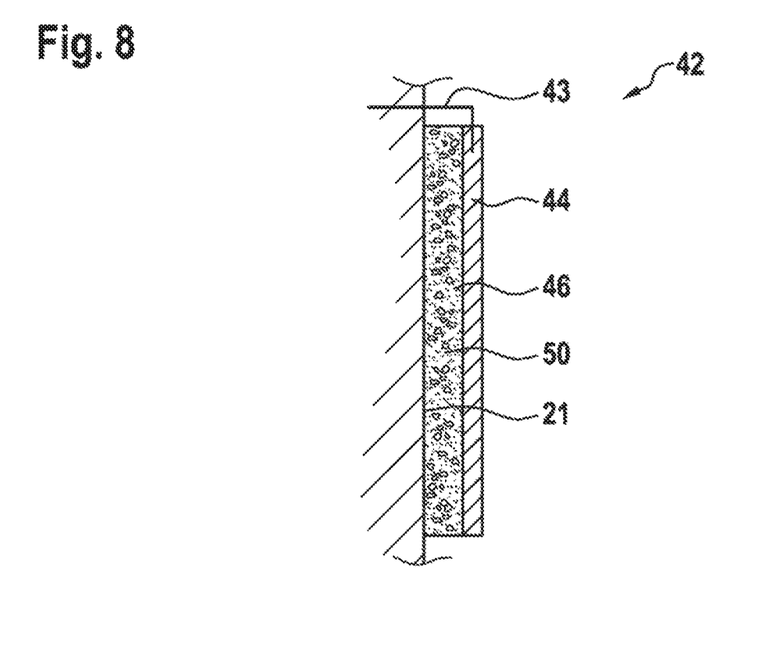
FIG. 8 is a cross-sectional view of a portion of the elastically compliant second terminal of FIG. 3.

Referring to FIGS. 6 and 8, the first cell terminal 40 and the second cell terminal 42 each have a terminal first end 43, a terminal second end 44, and a compliant portion 46 disposed between the terminal second end 44 and cell housing 21. The terminal first end 43 of each of the first and second cell terminals 40, 42 are electrically connected to the corresponding electrode plate of the electrode assembly 60, and are configured to pass through the cell housing 21 in a sealed manner. The compliant portion 46 and the terminal second end 44 are disposed outside the cell housing 21.

Figure 5:
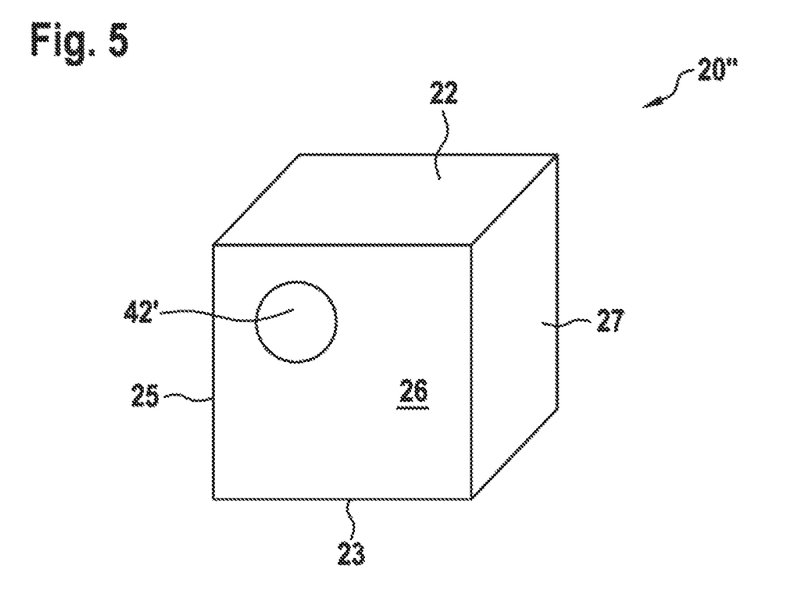
FIG. 5 is a perspective view of the cell of FIG. 3 including alternative elastically compliant terminals.

The terminal second end 44 of each of the first and second cell terminals 40, 42 is a thin electrically conductive plate such as a foil, for example a metal foil. In the illustrated embodiment, a profile of the terminal second end 44 has a rectangular shape, but is not limited to this shape. For example, in some embodiments the profile of the terminal second end 44 has a circular shape (FIG. 5) or an irregular shape such an inverted T shape (FIG. 2).

The compliant portion 46 is disposed between the terminal second end 44 and the cell housing 21 and is formed of an elastically compliant material. As used herein, the term "compliant" refers to the ability to yield or give way when under sufficient force, and the term "elastically compliant" refers to the ability to elastically return to the unloaded configuration when the force is removed. In the illustrated embodiment, for example, the compliant portion 46 is a foam pad 50 that is layered with the terminal second end 44 and bonded thereto using an adhesive to form a lamination. The foam pad 50 has the same peripheral shape and dimensions as the terminal second end 44.

Referring again to FIG. 2, the array of battery cells 20 is disposed within the battery pack housing 2 such that an end, for example the second end 22, of each cell 20 faces the base plate 3 of the battery pack housing 2. The cells 20 are arranged in a grid pattern so as to include rows R1, R2, R3, R4 of battery cells 20 and columns C1, C2, C3, C4, C5 of battery cells 20. The cells 20 are oriented so as to achieve a serial electrical connection between adjacent cells 20 of a row and between adjacent rows of the array.

The cells 20 are arranged so that the first cell terminal 40 of one cell 20 directly contacts and forms an electrical connection with the second cell terminal 42 of an adjacent cell 20. The electrical connection between adjacent cells 20 is assured by urging the cells 20 of a row together. In some embodiments, a compression force along the cell rows is achieved by providing an elastic member 13 between the cells 20 of the row and the sidewall 4 of the battery pack housing 2. For example, a wave spring 13 can be disposed at one or both ends of each row R1, R2, R3, R4 to ensure positive contact between adjacent cells 20 of the row. Similarly, a wave spring 13 can be disposed at one or both ends of each column C1, C2, C3, C4, C5 to ensure positive contact between adjacent cells 20 of the column. In some embodiments, the wave spring 13 applies a compressive force that urges the first cell terminal 40 against the second cell terminal 42 in such a way and/or with sufficient force that and at least one of the compliant portion 46 first cell terminal 40 and the second cell terminal 42 is deformed by the compressive force.

Figure 9:
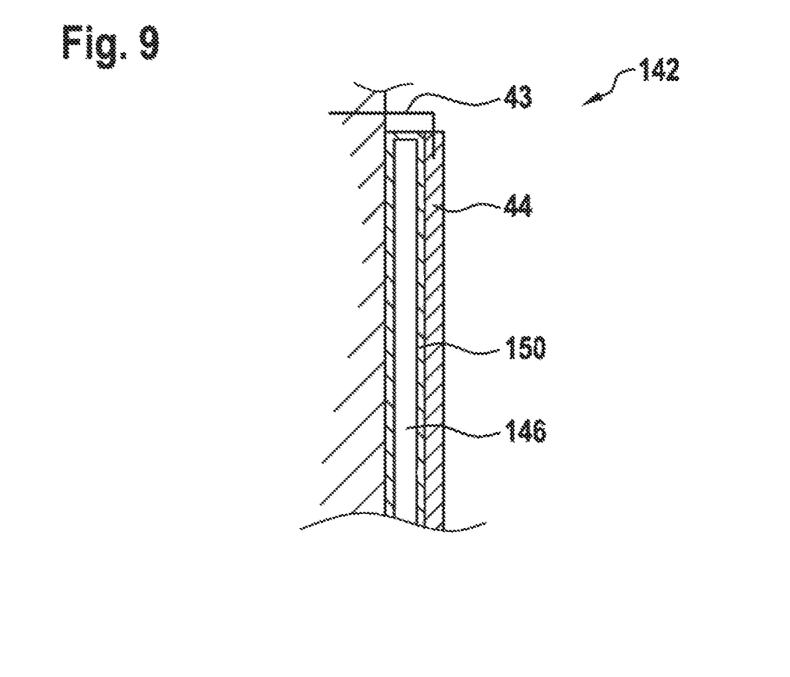
FIG. 9 is a cross-sectional view of a portion an alternative elastically compliant terminal.

Referring to FIG. 9, an alternative cell terminal 142 is similar to the cell terminal 42 described above with respect to FIG. 8, and common features will be referred to using common reference numbers. The alternative cell terminal 142 has a terminal first end 43, a terminal second end 44, and an alternative compliant portion 146 disposed between the terminal second end 44 and cell housing 21. The alternative elastically compliant portion 146 is a fluid filled bladder 150 that is layered with the terminal second end 44 and bonded thereto using an adhesive to form a lamination. In the illustrated embodiment, the bladder 150 has the same peripheral shape and dimensions as the terminal second end 44.

Figure 10:
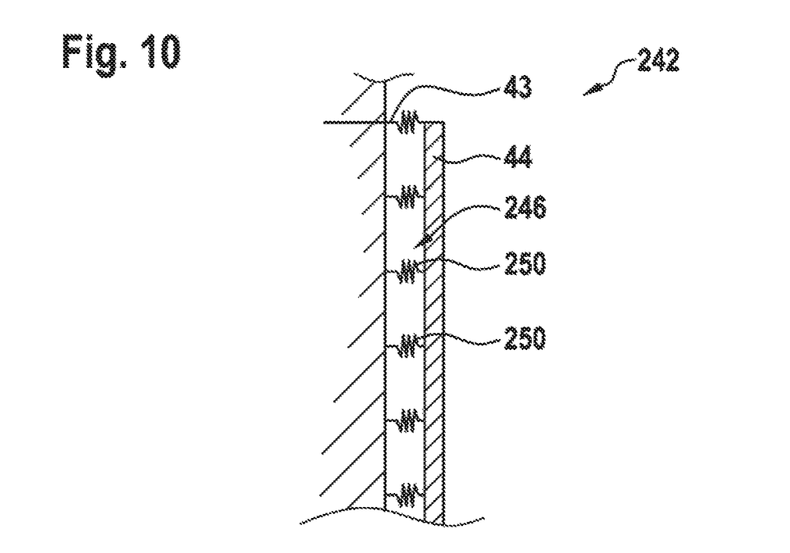
FIG. 10 is a cross-sectional view of a portion an alternative elastically compliant terminal.
Figure 11:
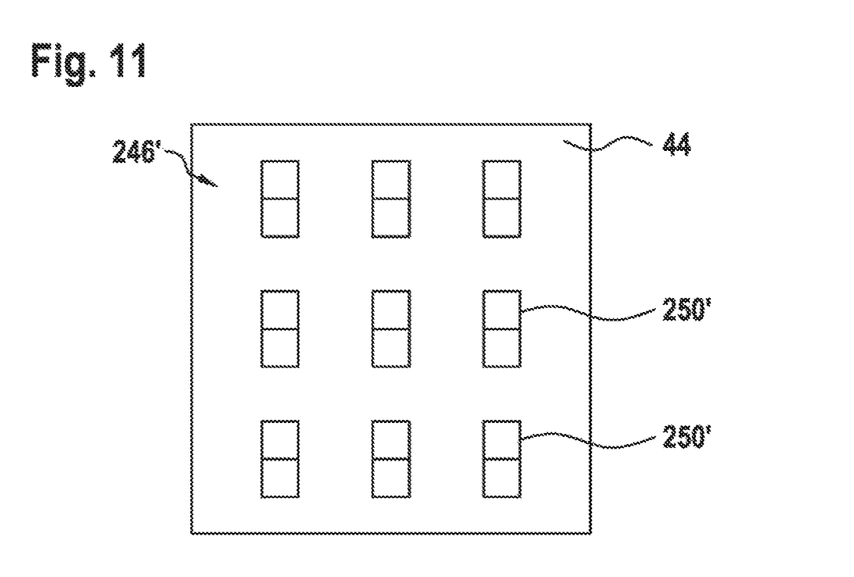
FIG. 11 is a view of another alternative elastically compliant terminal as seen along line 11-11 of FIG. 12.
Figure 12:
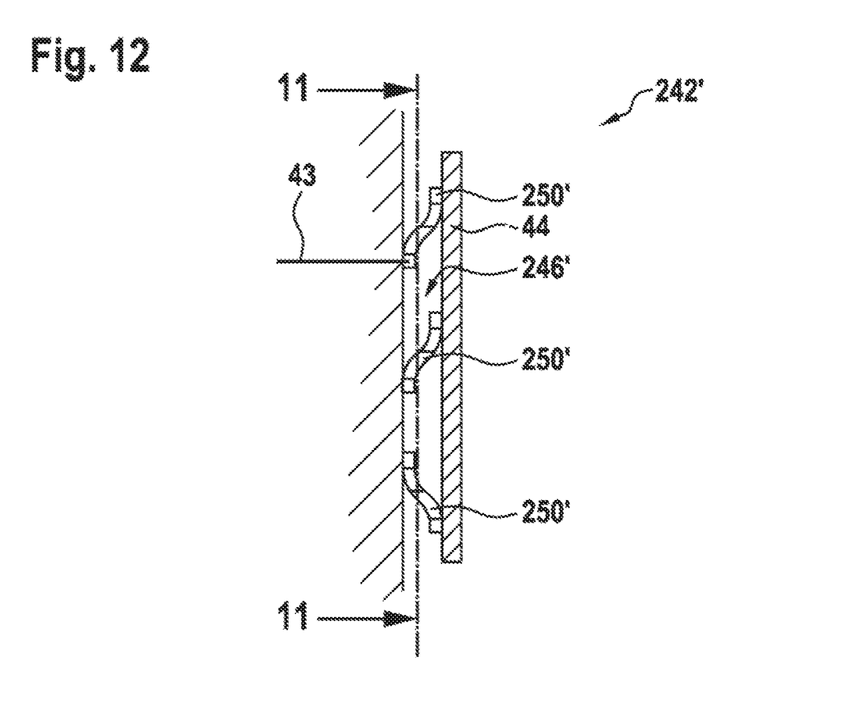
FIG. 12 is a cross-sectional view of the elastically compliant terminal of FIG. 11.

Referring to FIGS. 10-12, another alternative cell terminal 242 is similar to the cell terminal 42 described above with respect to FIG. 8, and common features will be referred to using common reference numbers. The alternative cell terminal 242 has a terminal first end 43, a terminal second end 44, and an alternative compliant portion 246 disposed between the terminal second end 44 and cell housing 21. The alternative elastically compliant portion 246 includes one or more springs 250 connected at one end to the cell housing 21 and at an opposed end to the terminal second end 44. In the embodiment illustrated in FIG. 10, the springs 250 are coiled compression springs. However, the springs 250 may have other configurations. For example, as shown in FIGS. 11 and 12, the alternative compliant portion 246' may include an array of leaf springs 250' that are evenly distributed about an area defined by the terminal second end 44.

Figure 13:
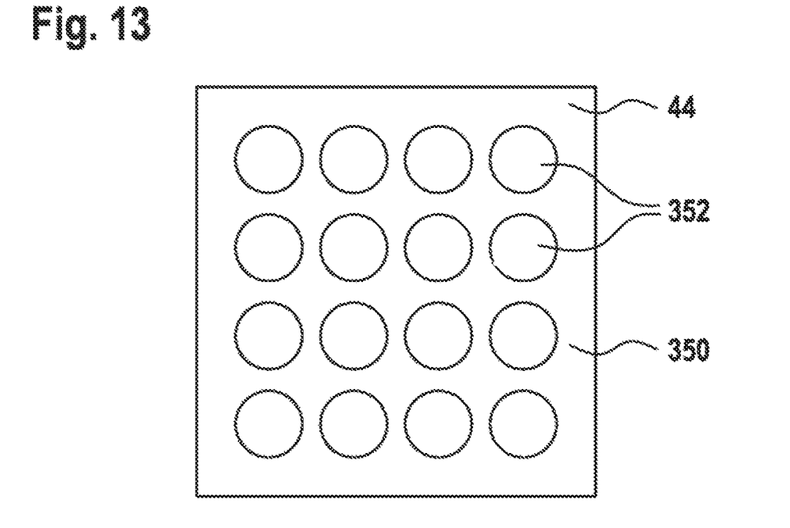
FIG. 13 is a view of another alternative elastically compliant terminal as seen along line 13-13 of FIG. 14.
Figure 14:
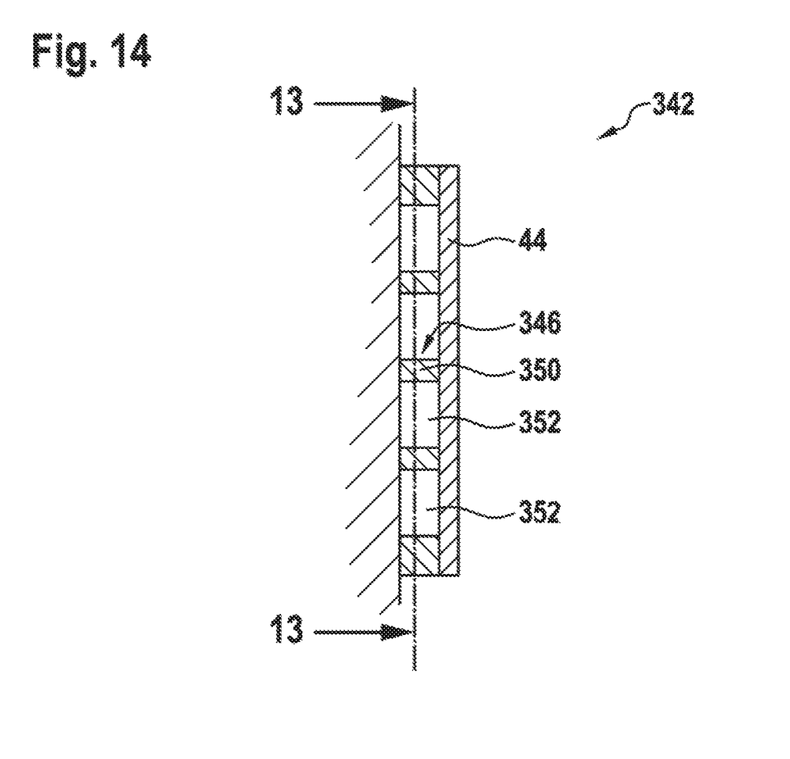
FIG. 14 is a cross-sectional view of the elastically compliant terminal of FIG. 13.

Referring to FIGS. 12 and 13, another alternative cell terminal 342 is similar to the cell terminal 42 described above with respect to FIG. 8, and common features will be referred to using common reference numbers. The alternative cell terminal 342 has a terminal first end 43, a terminal second end 44, and an alternative compliant portion 346 disposed between the terminal second end 44 and cell housing 21. The alternative elastically compliant portion 346 a perforated elastic pad 350 that is layered with the terminal second end 44 and bonded thereto using an adhesive to form a lamination. The pad 350 has the same peripheral shape and dimensions as the terminal second end 44, and also includes perforations 352 that extend through a thickness of the pad. The perforations are evenly distributed about an area defined by the terminal second end 44.

In all embodiments, the compliant portion 46, 146, 246, 346 is disposed between the terminal second end 44 and the cell housing 21. This feature enables the terminals 40, 42 to accommodate manufacturing differences between adjacent cells 20 of an array, and to comply to the configuration (for example, position, size, shape, etc.) of terminals that they engage. In addition, this feature may also provide a spring force that enhances contact between two terminals that are engaged, and may result in lower resistance that that of a rigid terminal without compliant features.

Figure 7:
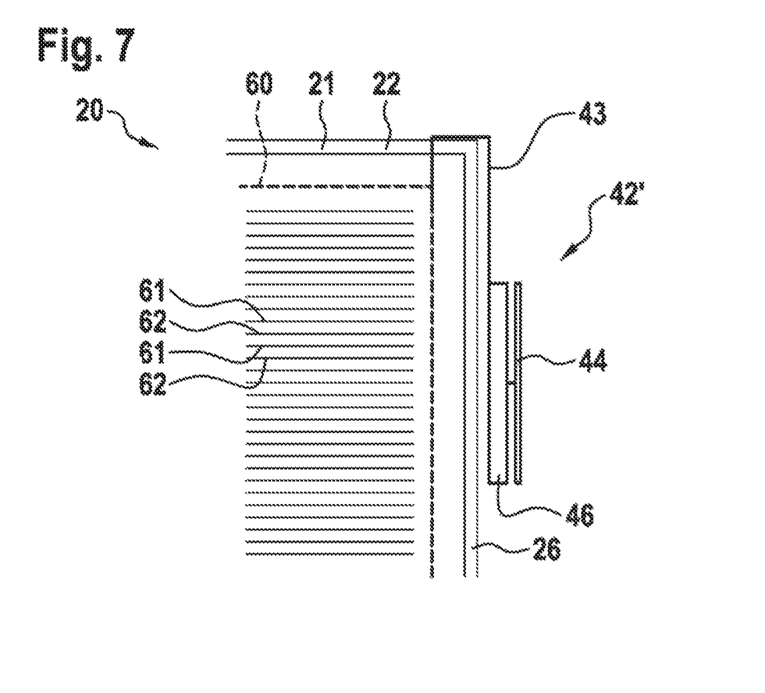
FIG. 7 is a schematic cross sectional view of a portion of the cell of FIG. 3 in which the terminal is partially exploded and illustrating an alternative electrical connection configuration.

In the embodiment illustrated in FIG. 3, the compliant portion 46 is an electrically insulative foam pad 50, and the electrical path between the first end 43 of the terminal 40, 42 and the second end 44 of the terminal 40, 42 circumvents the compliant portion 46. However, in some embodiments, the compliant portion 46 is electrically conductive, and forms a portion of the electrical path between the terminal first and second ends 43, 44 (FIG. 7). For example, in the embodiment illustrated in FIGS. 10-12, the compliant portion 46 includes electrically conductive springs, and the compliant portion 246, 246' is disposed in the electrical path between the terminal first end 43 and terminal second end 44.

Figure 4:
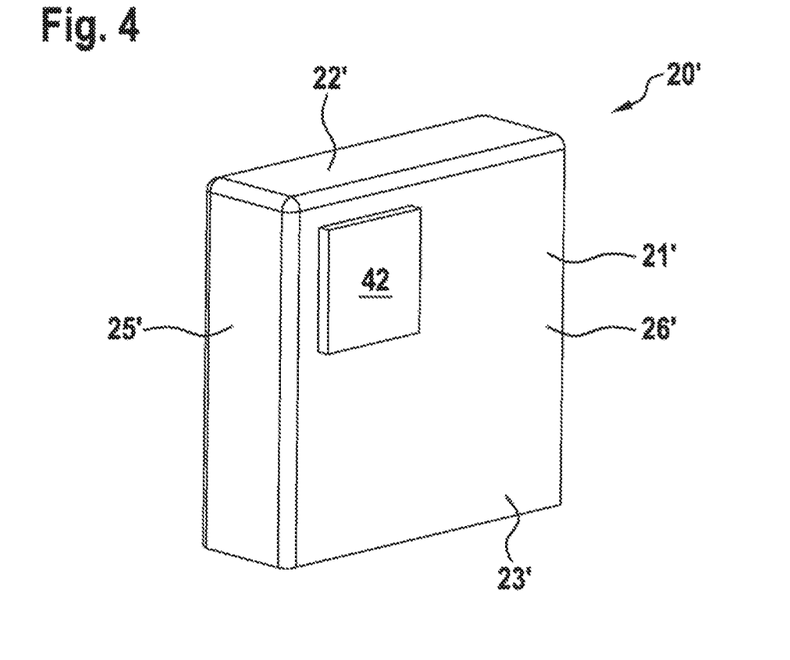
FIG. 4 is a perspective view of an alternative embodiment cell including elastically compliant terminals.

Although the cell 20 has a cube-shaped cell housing 21, the cell housing 21 is not limited to a cube shape. For example, the cell housing 21 may be rectangular in shape (FIG. 4). In another example, the cell housing 21 may have other polygonal shapes that permit close packing such as an eight surface structure having hexagonally arranged sides (not shown).

Moreover, the cells 20 are not limited to being a lithium-ion battery. For example, the cells 20 may be aluminum-ion, alkaline, nickel-cadmium, nickel metal hydride, or other type of cell.

Although the cell housing 21 is described herein as being a pouch cell housing formed of a metal laminated film, the cell housing 21 is not limited to this material or configuration. For example, the cell housing 21 may be formed of other materials and/or may be formed having a prismatic, cylindrical or other configuration.

Although the electrode assembly 60 is described herein as being a "stacked" electrode assembly that includes a series of stacked plates 61, 62, the electrode assembly 60 is not limited to this configuration. For example, in some embodiments, the electrode assembly 60 may include a rolled electrode assembly (e.g., a jelly roll assembly), a folded electrode assembly (i.e., a Z-fold assembly), or other electrode arrangement.

Selective illustrative embodiments of the cell including an elastically compliant cell terminal are described above in some detail. It should be understood that only structures considered necessary for clarifying the cell have been described herein. Other conventional structures, and those of ancillary and auxiliary components of the battery system, are assumed to be known and understood by those skilled in the art. Moreover, while working examples of the cell been described above, the cell is not limited to the working examples described above, but various design alterations may be carried out without departing from the device as set forth in the claims.

What is claimed is:

1. An electrochemical cell including
    a pouch cell housing that is formed of a metal laminated film,
    an electrode assembly disposed in the cell housing,
    an electrically conductive and elastically compliant terminal disposed on an outer surface of the cell housing, the terminal including
        a first end that passes through the housing and is electrically connected to the electrode assembly,
        a second end disposed outside the cell housing, the second end comprising an electrically conductive plate, the plate including an electrical contact surface surface that faces the cell housing outer surface, and
        elastically compliant springs disposed between the second end and the cell housing,
    wherein
        the springs are evenly distributed across an area defined by an electrical contact surface of the second end.

2. The electrochemical cell of claim 1 wherein each spring is a coil spring.

3. The electrochemical cell of clan 1 wherein each spring is a leaf spring.

4. The electrochemical cell of claim 1, wherein
    the plate includes a first surface that faces the cell housing and a second surface that is opposed to the first surface and faces away from the cell housing, and
    the springs extend between the first surface and the outer surface of the cell housing.

5. The electrochemical cell of claim 1, wherein the springs are distributed in a grid pattern.

6. The electrochemical cell of claim 1, wherein the springs are electrically conductive.

7. The electrochemical cell of claim 1, wherein the plate consists of a metal foil.

8. The electrochemical cell of claim 1, wherein a profile of the terminal second end has a polygonal shape.

* * * * *

UNITED STATES PATENT AND TRADEMARK OFFICE
CERTIFICATE OF CORRECTION

PATENT NO. : 11,139,541 B2  
APPLICATION NO. : 15/765713  
DATED : October 5, 2021  
INVENTOR(S) : Schoenherr It is certified that error appears in the above-identified patent and that said Letters Patent is hereby corrected as shown below:

In the Claims

In Claim 1, at Column 6, Lines 28-29: "electrical contact surface surface" should read --electrical contact surface--.

In Claim 3, at Column 6, Line 37: "clan 1" should read --claim 1--.

Signed and Sealed this  
Fifteenth Day of March, 2022

Drew Hirshfeld  
*Performing the Functions and Duties of the*  
*Under Secretary of Commerce for Intellectual Property and*  
*Director of the United States Patent and Trademark Office*